H. G. Batty,
Egg-Cup,
№ 27,095. Patented Feb. 14, 1860.
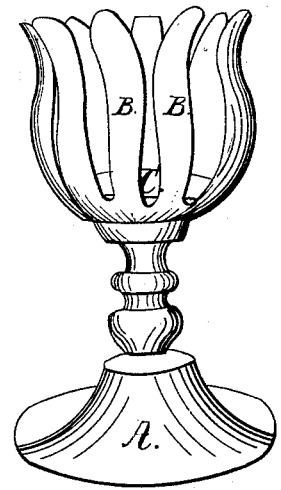
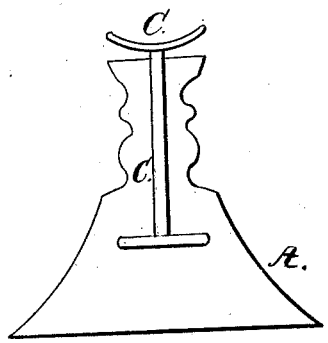
Witnesses:
George Richardson
Edward Newbould
Inventor:
Henrietta G. Batty

UNITED STATES PATENT OFFICE.

HENRIETTA G. BATTY, OF SPRINGFIELD, MASSACHUSETTS.

SPRING EGG-CUP.

Specification of Letters Patent No. 27,095, dated February 14, 1860.

*To all whom it may concern:*

Be it known that I, HENRIETTA G. BATTY, of Springfield, in the county of Hampden and Commonwealth of Massachusetts, have invented a new and Improved Spring Egg-Cup; and I do hereby declare that the following is a full and exact description thereof, reference being had to the accompanying drawings and the letters of reference marked thereon.

The nature of my invention consists in providing a small metallic standard, as shown at Figure 1, with six more or less elastic springs or arms curved outwardly and open at the top for the admission of the egg.

The elastic springs or arms B, B, attached to the standard A, A, are composed of thin strips of brass or any other elastic metal, and of a thickness just sufficient to hold the egg firmly when inserted with the larger end down and resting on the concave top of the central pin or slide C, C.

The springs B, B, are constructed of such a length as to admit the larger portion of the egg and to grasp it just beyond its shortest diameter; and they may be arranged of different lengths for adaptation to the different sizes of eggs.

For the purpose of expelling the egg-shell from the cup I construct in the center of the standard A, A, a movable pin or slide C, C. When the egg is inserted into the cup for table use, it rests on the concave top of the pin or slide C, C, and to remove the shell after the egg has been eaten, the cup or standard is inverted and a quick push is given by the finger to the lower end of the pin or slide C, C, thus allowing the person using the spring egg cup to do so with unsoiled hands, with much greater convenience and without being exposed to the annoying heat of the egg.

What I claim as my invention and desire to secure by Letters Patent is—

1. The construction and arrangement of the elastic springs B, B, attached to the metallic standard A, A, for the purpose of holding the egg more securely and without contact with the hand, while in use.

2. I also claim the construction and combination of the movable pin or slide C, C, passing through the standard A, A, in the manner and for the purposes as herein substantially set forth.

HENRIETTA G. BATTY.

Witnesses:
R. S. RAYMOND,
R. B. HILDRETH.